United States Patent
Äijälä et al.

[11] Patent Number: 5,851,260
[45] Date of Patent: Dec. 22, 1998

[54] SUSPENSION FERTILIZER SUITABLE FOR IRRIGATION FERTILIZATION, AND A PROCESS FOR ITS PREPARATION

[75] Inventors: Hannu Äijälä ; Thomas Ahlnäs, both of Helsinki, Finland

[73] Assignee: Kemira Agro Oy, Helsinki, Finland

[21] Appl. No.: 727,604

[22] PCT Filed: Apr. 13, 1995

[86] PCT No.: PCT/FI95/00218

§ 371 Date: Dec. 26, 1996

§ 102(e) Date: Dec. 26, 1996

[87] PCT Pub. No.: WO95/28369

PCT Pub. Date: Oct. 26, 1995

[30] Foreign Application Priority Data

Apr. 15, 1994 [FI] Finland ..................................... 941759

[51] Int. Cl.⁶ ..................................................... C05G 5/00
[52] U.S. Cl. ........................ 71/28; 71/29; 71/30; 71/33; 71/34; 71/35; 71/36; 71/48; 71/49; 71/50; 71/51; 71/53; 71/58; 71/59; 71/60; 71/61; 71/63; 71/64.08
[58] Field of Search ............................... 71/64.08, 28–30, 71/33, 34, 35, 36, 48, 49, 50, 51, 53, 58, 59, 60, 61, 63

[56] References Cited

FOREIGN PATENT DOCUMENTS

| | | |
|---|---|---|
| 123 164 | 7/1967 | Denmark . |
| 0 190 819 A3 | 8/1986 | European Pat. Off. . |
| 0 427 094 A1 | 5/1991 | European Pat. Off. . |
| 0 485 225 A1 | 5/1992 | European Pat. Off. . |
| 2 679 552 | 1/1993 | France . |
| 29 02 651 A1 | 5/1980 | Germany . |
| 1 035 609 | 7/1966 | United Kingdom . |
| 1 173 829 | 12/1969 | United Kingdom . |
| 1 268 248 | 3/1972 | United Kingdom . |

OTHER PUBLICATIONS

R.T. Hukki, *Mineraalien hienonnus ja rikastus*, Otava 1964, pp. 24–27.

*Primary Examiner*—Wayne Langel
*Attorney, Agent, or Firm*—Gary M. Nath; Suet M. Chong; Nath & Associates

[57] ABSTRACT

The invention relates to a stable aqueous fertilizer suspension suitable for drip irrigation, which suspension contains 5–55% by weight water and 45–95% by weight of one or several plant-nutrient containing substances, of which at least one contains water-insoluble solid particles, the particle size of the solid particles contained in the suspension being less than 50 $\mu$m and the pH of the suspension being within the range 2–7. The invention also relates to a process for the preparation of this suspension.

12 Claims, No Drawings

SUSPENSION FERTILIZER SUITABLE FOR IRRIGATION FERTILIZATION, AND A PROCESS FOR ITS PREPARATION

The present invention relates to a stable aqueous fertilizer suspension suitable for drip irrigation and to a method for its preparation.

Application of fertilizers through irrigation systems has increased drastically, especially in cultivation which uses irrigation anyway. Especially on dry and hot cultivation areas, irrigation systems are used in which the irrigation water is fed to the plants via pipe systems. The same method is generally used also in greenhouses and on open field cultivation of horticultural crops. Water may be distributed to plants by spraying, by sprinkler irrigation, or by drip irrigation, depending on the case. The addition of fertilizers with irrigation water has proved to be a very efficient and environment-friendly method for increasing the yield. Liquid fertilizer can be injected to irrigation water in the said systems. Fertilizers can thus be dosed according to the need of plants and the nutrient efficiency ratio (nutrient uptake divided by amount applied) will be improved. The risk for leaching with fertigation will be substantially lower than with conventional fertilizers. In a drip irrigation system, water is led to the root area of each plant via laterals with nozzles. Laterals are connected with larger pipelines, into which water is pumped or fed by gravity. From the nozzle the irrigation water drips directly to the root system of the plant and is immediately available for the plant. Water evaporation losses are also low with such arrangements.

The orifice of the nozzle used in irrigation systems may be very small, e.g. 100 $\mu$m, and therefore completely water-soluble fertilizers have conventionally been used in irrigation to avoid clogging. In addition, farmers use, as a precaution, screens which can be installed in lines before the nozzles to hinder the entry of any particles to the nozzles.

The mesh sizes of such screens are typically 100–150 $\mu$m, and if the fertilizer contains particles larger than this, they will cause clogging of the screens and thereby problems in cultivation. Clogging is said to be a problem in drip irrigation especially if fertilizers are made of NPK-raw materials which are typically used in conventional granular field fertilizers. The water solubility of such raw materials is typically 70–95%. The raw materials of completely water-soluble fertilizers are expensive, up to three times more expensive than raw materials of the field-fertilizer grades, and the concentrations of the solutions are low, typically 30–50%. If a water-soluble fertilizer is delivered to farmer in the form of a solution, the transportation costs will be considerable owing to the transportation of a large amount of water. If, on the other hand, fertilizers are delivered as solid powders, the farmer must have dissolving reactors, the knowledge for preparing solutions, and more labor. Purification and crystallizing processes which are used for making raw materials for solid water-soluble fertilizers, are energy consuming and environmentally harmful. Suspension fertilizers, for their part, have not been used in drip irrigation, because the crystals present in the suspension would cause clogging of the pipes, screens, filters, and nozzles. Conventional suspensions contain large particles, 150–1000 $\mu$m, and they clog the nozzles, whereupon the plant will receive neither water nor fertilizers.

In suspensions the concentration can be increased to a high level (60–95%), and the fertilizer can still be in liquid form also during transport. Suspension fertilizers are prepared by known methods by mixing and dispersing solid fertilizer raw materials in water. Mostly the size of the solid particles in such suspensions is rather large, >200 $\mu$m, and the solids settle out of the suspensions unless the suspensions are constantly stirred. Attempts have been made to improve the stability of suspensions by adding a finely-divided clay or some other similar thickeners. If this type of thickeners are used, insoluble useless solids (in terms of fertilization) are added to the product in large amounts (up to 5–10%). In U.S. Pat. No. 3,519,413, a hydrophilic gum is used to prevent the settling of the solids; methyl cellulose and carboxymethyl cellulose have also been interpreted as such gums. The particle size of the solid material has in these cases been 100–1000 $\mu$m. In U.S. Pat. No. 3,950,159, the suspending agent used is a polysaccharide gum in an amount of 0.1–5%. By the use of thickeners and stabilizers the settling propensity of solids can be reduced temporarily, but in general, however, the stability of such a suspension with relatively coarse particles is not good for storage. If only partly water-soluble materials have been used in the preparation of a suspension, the suspension has not been usable in drip irrigation systems, because large, >100 $\mu$m, particles will clog the small-orifice nozzles and screens. In FR patent 2 679 552, a suspension is typically made from completely water-soluble raw materials, and suspension can be dissolved completely by adding water. Xanthane gum or an analogous substance and ethoxyl phenol are used in it as additives. Such a suspension is fully comparable to water-soluble fertilizers, and it is prepared from expensive raw materials and additives. Xanthate gum and other additives of the same type have a disadvantage that they cause growth of microbes and algae in the pipes.

The object of the invention is to provide a stable aqueous fertilizer suspension suitable for drip irrigation, by means of which the above disadvantages of known fertilizer suspensions can be avoided and which can, in particular, be made from inexpensive raw materials.

The main characteristics of the invention are given in the accompanying patent claims.

According to the invention, it has been observed, surprisingly, that it is possible to produce an aqueous fertilizer suspension which is suitable for drip irrigation and which is stable even in a highly concentrated form without the use of suspending agents or other analogous additives, which have been regarded as indispensable in known fertilizer suspensions in order to produce a stable suspension. Furthermore, it has been observed, surprisingly, that it is possible to use as raw materials, inexpensive NPK raw materials, which are used in, for example, field fertilizers and which contain water-insoluble solid particles, and partly insoluble recycled waste, when the suspension is prepared using pearl mill grinding, known from, for example, the preparation of pigments, at a high solids content and at a controlled pH.

The invention thus relates to a stable aqueous fertilizer suspension which is suitable for drip irrigation and which contains 5–55% water and 45–95% by weight of one or more plant-nutrient containing substances, at least one of the substances containing water-insoluble solid particles, the particle size of the solid particles contained in the suspension being less than 50 $\mu$m and the pH of the suspension being within the range 2–7.

In this context, the expression "plant-nutrient containing substances" includes substances which contain at least one of the plant nutrients N, P, K and Mg, and also micronutrients and other substances containing NPK or micronutrients, such as recycled wastes.

In an aqueous fertilizer suspension according to the invention, the particle size of the solid particles is below 50

μm, and the lower limit of the particle size is typically approx. 0.01 μm. The particle size of the solid particles is preferably in the main within the range 0.2–20 μm.

An aqueous fertilizer suspension according to the invention contains water preferably 10–50% by weight, most preferably 15–25% by weight, and one or more plant-nutrient containing substances preferably 50–90% by weight, most preferably 75–85% by weight.

An aqueous fertilizer suspension according to the invention preferably contains only water and the said plant-nutrient containing substance/substances, i.e. it contains no additives, especially no suspending agents or other agents of a similar type.

The plant nutrient contained in an aqueous fertilizer suspension according to the invention is based on at least one of the cations $NH_4^+$, $K^+$, $Ca^{2+}$, and $Mg^{2+}$, or on at least one of the anions $NO_3^-$, $Cl^-$, $SO_4^{2-}$, phosphates and polyphosphates, and/or on urea.

According to one preferred embodiment of the invention, the plant-nutrient containing raw material/material used is a NPK raw material/NPK raw materials of the field-fertilizer grade. Typical raw materials of field fertilizers include (in parentheses, the typical insoluble portion in a 10% solution, in percent by weight): $K_2SO_4$ (3.6), $(NH_4)_2SO_4$ (0.4), diammonium phosphate DAP (11.1), monoammonium phosphate MAP (8.7), $H_3PO_4$ (2.0), urea (0.0), methylene urea (94.0), KCl (0.09), $KNO_3$ (0.03), $K_2CO_3$ (0.0), $MgSO_4$ (0.2), superphosphate (60.5), double superphosphate (15.8), and recycled waste, such as bone meal and vinasse. A suspension according to the invention is economical, since it is possible to use these inexpensive, partly water-insoluble raw materials which require less chemical processing. Alongside these raw materials it is, of course, possible to use also completely water-soluble raw materials such as potassium nitrate, ammonium nitrate, urea phosphate, etc.

An aqueous fertilizer suspension according to the invention may, in addition, contain as a plant-nutrient containing substance one or more micronutrients (trace elements). Examples of usable micronutrients include boric acid, borates, sodium molybdate, sodium selenate, potassium selenate, potassium iodide, chromium chloride, as well as iron, copper, cobalt, manganese and zinc in the form of phosphates, sulfates, chlorides, carbonates or chelates.

The invention also relates to a process for the preparation of the aqueous fertilizer suspension described above, in which process one or more plant-nutrient containing substances and water are dispersed and, when necessary, the pH is adjusted by means of an acid or a base to a suitable value within the range 2–7 and, when necessary, a preliminary milling is carried out to a particle size which is in the main within the range 100–1000 μm, and finally a milling in a pearl mill is performed to form a suspension in which the particle size of the solid particles is below 50 μm, preferably in the main within the range 0.2–20 μm.

When NPK raw materials needed by plants, possibly trace elements, and water are selected in suitable proportions (salt content for example 45–90%), and these are dispersed, and, if the particles are >1 mm, they are pre-ground, and a suitable pH within the range 2–7 is selected, depending on the raw materials and the targeted product, it is possible to mill the suspension in a pearl mill to a smaller particle size, 0.1–50 μm, than conventional. By regulating the amounts of the raw materials, the pH, and the particle size, a suspension is obtained which is stable without any other additives. When the particle size is in the order of micrometers, the portion possibly recrystallizing out of the solution after the milling will divide into almost unnoticeably small layers on the surfaces of already really small crystals. By a suitable selection of the salt content, the particles can be caused to remain evenly dispersed, and recrystallization and redissolving will not occur to a notable degree. By adjusting the particle size and the pH it is also possible to prepare suspensions in which a thin, e.g. 1–2 mm, solution film forms on the surface of the suspension during storage, the rest being practically stable and homogenous. This solution film protects the suspension from drying, as long as it is not too thick so that detrimental unidirectional crystal growth could occur. By optimizing the particle size, nutrient salts, and pH in such a manner that only a 1–2 mm solution film will form on the suspension surface during storage it is possible to increase the shelf life of the suspension without additional chemicals. By lowering the pH, for example to 3, for example by means of phosphoric acid, when the suspension is diluted with water to, for example, a 10% solution, a considerably lower quantity of solid particles remaining in the solution will be achieved than that in a suspension prepared at a normal pH (6–7), and clogging propensity is decreased. The low pH is also an advantage in irrigation waters having a high pH, since the risk of precipitation and the risk of growth of organisms are decreased as pH decreases. The low pH is also advantageous for a soil having a high pH, since the solubility of phosphorus and thereby the amount of phosphorus intake by a plant increase at a low pH. For lowering the pH, phosphoric acid, sulfuric acid, nitric acid, maleic acid anhydride, formic acid, oxalic acid, citric acid, acetic acid, and $C_2$–$C_4$ dicarboxcylic acid can be used. For raising the pH, when necessary, lye, ammonia, soda, calcium carbonate, waterglass, calcium hydroxide and potassium hydroxide can be used. Trace element and nutrient salts even themselves act as stabilizers in the suspension. Since the size of the solid particles in the suspension is very small, fertilizers according to the invention are suitable for a drip irrigation system, the insoluble particles passing through nozzles and screens.

A fertilizer used in drip irrigation is typically diluted to a concentration of approx. 0.1–0.2% by weight.

The invention is described below in greater detail with the help of embodiment examples. The percentages given in the examples are percentages by weight.

EXAMPLE 1

From a cheap-quality urea, diammonium phosphate and potassium sulfate, as well as trace elements, a suspension with a salt content of 80% was prepared, wherein the principal nutrient proportions N—$P_2O_5$—$K_2O$ were 11-8-19%. The raw materials were first mixed with water to form a flowing suspension in a conventional disperser, in which typically 100–1000 μm is obtained as their particle size, and the pH was adjusted to 6.8. This suspension was further pumped into a pearl mill, in which it was turned into a stable suspension having a particle size of 0.01–10 μm.

EXAMPLE 2

The suspension prepared in Example 1 was used as a drip irrigation fertilizer in the cultivation of paprika in a greenhouse. In the reference experiment, a commercial completely water-soluble fertilizer of similar nutrient proportions was used. By the use of the suspension according to the invention, a result almost in the same order as with the water-soluble fertilizer was obtained. During the cultivation experiment, in the course of 7.5 weeks, no clogging was detected in the drip irrigation nozzles.

EXAMPLE 3

In a manner corresponding to that in Example 1, three suspensions were prepared from the raw materials of Example 1, i.e. N—P$_2$O$_5$—K$_2$O 17-8-9% (salt content 80% and pH 5.3), 11-11-11% (salt content 70% and pH 6.3), and 10-3-21% (salt content 80% and pH 4.9), and these were used in an irrigation system in cucumber cultivation and were compared with completely water-soluble commercial fertilizers having similar nutrient proportions. The cultivation conditions were difficult in the experiment, owing to dry weather conditions, but similar for all the fertilizers being compared. The suspension according to the invention yielded a crop of 63.9 metric tons/hectare and the completely water soluble fertilizer 59.7 metric tons/hectare; thus the result obtained with the suspension fertilizer according to the invention was even better than that obtained with the expensive water-soluble fertilizer normally used. No clogging was detected.

EXAMPLE 4

In a manner similar to that in Example 1, a suspension having a salt content of 80% was prepared from the raw materials of Example 1, 10-8-18%, pH 6.2, and this suspension was used in the cultivation of tomatoes in a drip irrigation system and was compared with a completely water-soluble fertilizer having similar nutrient proportions. By using the suspension according to the invention a tomato crop of 139 kg/12 m$^2$, and with the completely water-soluble fertilizer a crop of 136 kg/12 m$^2$ was obtained. Thus, by using the suspension according to the invention, an even better yield was obtained that by using the water-soluble fertilizer.

EXAMPLE 5

The suspension prepared according to Example 4 was used for fertilizing paprika by means of a pivot irrigation system, and it was compared with a completely water-soluble fertilizer. The yield of paprika obtained with the suspension was 1.93 kg/m$^2$, and with the completely water-soluble fertilizer 1.85 kg/m$^2$, while the yield of unfertilized paprika was 0.6 kg/m$^2$. There were no problems in the use of the fertilizer.

EXAMPLE 6

In a manner corresponding to that in Example 1, a suspension having a salt content of 75% was prepared from the raw materials of Example 1, 9-13-14%, pH 6.5, and this was compared with a granular fertilizer in a cabbage cultivation experiment. During the experiment, the cabbages were given theoretically the same quantities of nutrients in the form of a suspension and as granules. In addition, the experiment included unfertilized cabbages, which received only water from a drip irrigation system. When granular fertilizer was used, the granules were dosed into the soil at the beginning of the experiment and by drip irrigation the same amount of water was administered as when using the suspension. The crop of unfertilized cabbage was 348 g/pot, that of cabbage fertilized with granules 449 g/pot, and that of cabbage fertilized with the suspension 590 g/pot. Thus a result corresponding to that obtained by using the water-soluble fertilizer was typically obtained by using the suspension fertilizer.

EXAMPLE 7

In a manner corresponding to Example 1, a suspension having a salt content of 76% was prepared from ammonium sulfate, potassium sulfate and methylene urea, 10-10-10%, pH 6.7, which was compared in the growing of grass with a golf-green fertilizer administered in granular form. A commercial golf-green fertilizer 20-5-10 yielded in the experiment a crop of 15.9 g/pot, and the suspension administered in connection with irrigation yielded a crop of 16.5 g/pot, the unfertilized crop being 6.9 g/pot.

EXAMPLE 8

In a manner corresponding to that in Example 1, a suspension having a salt content of 45% was prepared from the raw materials of Example 7, 8-8-8%, pH 6.7, which was well flowing and stable and suitable for being sprayed as such directly on cultivations, for example by using common pest control sprayers.

EXAMPLE 9

In a manner corresponding to that in Example 1, a suspension having a salt content of 80% was prepared from inexpensive urea, diammonium phosphate, potassium phosphate and potassium nitrate, 17-17-12%, pH 6.4. The suspension was stable and it contained nutrients N—P$_2$O$_5$—K$_2$O in total 46%.

EXAMPLE 10

In a manner corresponding to that in Example 1, a suspension having a salt content of 80% was prepared from the raw materials of Example 1, 9-8-17%, pH 6.7, and it was stored for one year. In the course of the year, some water had come to the surface of the suspension, but, by shaking, the entire sample could easily be rendered homogenous. Microscopic pictures showed that no notable growth of the particle size had occurred in the suspension and that it was completely usable.

EXAMPLE 11

In a manner corresponding to that in Example 1, a suspension having a salt content of 80% was prepared from cheap-quality urea, phosphoric acid, diammonium phosphate, potassium sulfate and trace elements, N—P$_2$O$_5$—K$_2$O 11-9-20%, and its pH was adjusted to 3. The suspension was very well flowing and homogenous. When the suspension was dissolved in water to form a 10% intermediate concentrate, it was observed that a considerably smaller amount of insoluble matter was left than with a corresponding suspension having a pH of 6. The suspension having a pH of 3 was also clearly better flowing than the suspension in which the pH had been adjusted to 6.

EXAMPLE 12

In a manner corresponding to that in Example 1, a suspension having a salt content of 80 e was prepared from cheap-quality urea, diammonium phosphate, potassium sulfate, magnesium oxide, and trace elements, N—P$_2$O$_5$—K$_2$O+MgO 11-9-20+1.2%, the pH of the suspension being 6.2, and, respectively, a suspension having a salt content also of 80% and nutrient proportions 11-9-20+1.2% was made from cheap-quality urea, phosphoric acid, potassium sulfate, magnesium oxide and trace elements, but the pH of the suspension being 2.4. These suspensions were compared in the cultivation of tomatoes by the drip irrigation method in an area where the pH of water was high, 8.2. owing to its flow properties the acid suspension was easier to use, and a better crop yield, 116.2 metric tons/hectare, was obtained by using it than by using the corresponding neutral suspension, in which case the crop yield was 111.7 metric tons/hectare. The crop yield obtained with a completely water-soluble fertilizer was 111.2 metric tons/hectare and with a granular fertilizer 83.3 metric tons/hectare.

EXAMPLE 13

In a manner corresponding to that in Example 1, a suspension having a salt content of 80% was prepared from inexpensive diammonium phosphate, the nutrient proportions in the suspension being N—$P_2O_5$ 14–38%, pH 7.0. The suspension was used as a fertilizer, the distribution being easy with a common pest control sprayer.

EXAMPLE 14

In a manner corresponding to that in Example 1, a suspension having a salt content of 85% was prepared from inexpensive potassium sulfate, the nutrient proportion in the suspension being $K_2O$ 42% and the pH 6.5.

EXAMPLE 15

In a manner corresponding to that in Example 1, a suspension having a salt content of 80% was prepared from double super-phosphate, the nutrient proportion in the suspension being $P_2O_5$ 37% and the pH 4.8.

EXAMPLE 16

In a manner corresponding to that in Example 1, a suspension having a salt content of 70% was prepared from super-phosphate, the nutrient proportion in the suspension being $P_2O_5$ 14% and the pH 3.8.

We claim:

1. A stable aqueous fertilizer suspension suitable for drip irrigation, consisting essentially of:
   (i) 5–55% by weight water; and
   (ii) 45–95% by weight of one or more plant-nutrient containing substance, wherein:
     said one or more plant-nutrient containing substance is based on at least one cation selected from a group consisting of $NH_4^+$, $K^+$, $Ca^{2+}$ and $Mg^{2+}$; on at least one anion selected from a group consisting of $NO_3^-$, $Cl^-$, $SO_4^{2-}$, phosphates and polyphosphates; on urea; or on a combination thereof; and
     said one or more plant-nutrient containing substance contains water-insoluble solid particles, having a particle size of less than 50 $\mu$m, and the suspension having a pH within the range of 2 to less than 7.

2. An aqueous fertilizer suspension according to claim 1, wherein the particle size of the solid particles is in the main within the range 0.2–20 $\mu$m.

3. An aqueous fertilizer suspension according to claim 1, consisting essentially of:
   (i) 10–50% by weight water, and
   (ii) 50–90% by weight of said one or more plant-nutrient containing substance.

4. An aqueous fertilizer suspension according to claim 1, wherein the water and said one or more plant-nutrient containing substance account for 100% of the total weight of the suspension.

5. An aqueous fertilizer suspension according to claim 1, wherein the one or more plant-nutrient containing substance is field fertilizer grade NPK raw material.

6. An aqueous fertilizer suspension according to claim 1, wherein the one or more plant-nutrient containing substance is selected from a group consisting of urea, phosphoric acid, urea phosphate, ammonium phosphate, ammonium sulfate, ammonium nitrate, potassium sulfate, potassium chloride, methylene urea, potassium nitrate, potassium carbonate, magnesium sulfate, magnesium nitrate, superphosphate, double superphosphate, recycled waste containing plant nutrient, and a combination thereof.

7. An aqueous fertilizer suspension according to claim 1, wherein the one or more plant-nutrient containing substance further comprises one or more micronutrient.

8. An aqueous fertilizer suspension according to claim 7, wherein the one or more micronutrient is selected from a group consisting of boric acid, borates, sodium molybdate, sodium selenate, potassium selenate, potassium iodide, chromium chloride, and iron, copper, cobalt, manganese and zinc in the forms of phosphates, sulfates, chlorides, carbonates and chelates.

9. An aqueous fertilizer suspension according to claim 3, consisting essentially of:
   (i) 15–25% by weight water, and
   (ii) 75–85% by weight of said one or more plant-nutrient containing substance.

10. An aqueous fertilizer suspension according to claim 6, wherein the recycled waste containing plant nutrient is selected from a group consisting of bone meal, vinasse, and a combination thereof.

11. A process for preparing an aqueous fertilizer suspension consisting essentially of:
   (i) mixing one or more plant-nutrient containing substance with water to form a suspension containing water-insoluble solid particles;
   (ii) adding a sufficient amount of an acid or a base to adjust the pH of the suspension to a value within the range 2–7;
   (iii) when necessary, milling the suspension to adjust the particle size of the solid particles to, in the main, within the range 100–1000 $\mu$m; and
   (iv) further milling the suspension in a pearl mill to form a suspension in which the particle size of the solid particles is less than 50 $\mu$m;
   wherein said suspension consists essentially of:
   (i) 5–55% by weight water; and
   (ii) 45–95% by weight of one or more plant-nutrient containing substance, wherein:
     said one or more plant-nutrient containing substance is based on at least one cation selected from a group consisting of $NH_4^+$, $K^+$, $Ca^{2+}$ and $Mg^{2+}$; on at least one anion selected from a group consisting of $NO_3^-$, $Cl^-$, $SO_4^{2-}$, phosphates and polyphosphates; on urea; or on a combination thereof; and
     said one or more plant-nutrient containing substance contains water-insoluble solid particles, having a particle size of less than 50 $\mu$m, and the suspension having a pH within the range 2–7.

12. A process according to claim 11, wherein step (iv) comprises milling the suspension in a pearl mill to form a suspension in which the particle size of the solid particles is in the main within the range 0.2–20 $\mu$m.

* * * * *